United States Patent
Kim et al.

(10) Patent No.: US 7,061,743 B2
(45) Date of Patent: Jun. 13, 2006

(54) MULTI-PULSE HVDC SYSTEM USING AUXILIARY CIRCUIT

(75) Inventors: Chan Ki Kim, Daejeon (KR); Gil Jo Jung, Daejeon (KR); Bong Eon Kho, Seoul (KR); Yong Ho An, Daejeon (KR); Se Hwan Choi, Seoul (KR); Jong Ki Choi, Daejeon (KR); Byeong Mo Yang, Daejeon (KR)

(73) Assignee: Korea Electric Power Corporation (KR)

( * ) Notice: Subject to any disclaimer, the term of this patent is extended or adjusted under 35 U.S.C. 154(b) by 286 days.

(21) Appl. No.: 10/342,486

(22) Filed: Jan. 15, 2003

(65) Prior Publication Data
US 2004/0085703 A1 May 6, 2004

(30) Foreign Application Priority Data
Oct. 30, 2002 (KR) ............... 10-2002-0066530

(51) Int. Cl.
*H01H 47/18* (2006.01)

(52) U.S. Cl. .............................. 361/185; 361/186

(58) Field of Classification Search ............. 361/184, 361/185, 186, 189, 190, 183; 363/48, 51–54, 363/35
See application file for complete search history.

(56) References Cited

U.S. PATENT DOCUMENTS

| 3,984,752 | A | * | 10/1976 | Akamatsu et al. ......... 363/138 |
| 4,308,575 | A | * | 12/1981 | Mase ........................... 363/48 |
| 4,758,939 | A | * | 7/1988 | Matsuo et al. ............... 363/68 |
| 5,751,563 | A | * | 5/1998 | Bjorklund .................... 363/35 |
| 6,728,120 | B1 | * | 4/2004 | Greif et al. .................. 363/40 |

FOREIGN PATENT DOCUMENTS

JP 55002312 A * 1/1980

* cited by examiner

*Primary Examiner*—Brian Sircus
*Assistant Examiner*—Danny Nguyen
(74) *Attorney, Agent, or Firm*—Cantor Colburn LLP (57) ABSTRACT

The present invention relates to a multi-pulse HVDC system which is capable of minimizing the number of thyristors by providing a thyristor auxiliary circuit in a conventional 12-pulse thyristor HVDC(High Voltage Direct Current), not using an additional stack of a thyristor and which is implemented based on an auxiliary circuit having a multi-pulse thyristor HVDC system like 24-pulse/36-pulse/48-pulse converters. The multi-pulse HVDC system is characterized in that an upper side thyristor converter 12 and a lower side thyristor converter 13 are installed in a Δ-Δ-Y transformer 11, and two current smoothing reactor 39 and a direct voltage dividing condenser 38 are installed between the upper side thyristor converter 12 and the lower side thyristor converter 13, and two thyristors 32, 33: $T_2$ and $T_1$ are connected to one double winding transformer 31.

4 Claims, 9 Drawing Sheets

MULTI-PULSE HVDC SYSTEM USING AUXILIARY CIRCUIT

BACKGROUND OF THE INVENTION

1. Field of the Invention

The present invention relates to a multi-pulse HVDC system which is capable of minimizing the number of thyristors by providing a thyristor auxiliary circuit in a conventional 12-pulse thyristor HVDC(High Voltage Direct Current), not using an additional stack of a thyristor and which is implemented based on an auxiliary circuit having a multi-pulse thyristor HVDC system like 24-pulse/36-pulse/48-pulse converters.

2. Description of the Background Art

An AC voltage and current outputted from a generator is a low current-large current. When transmitting power, the voltage and current are transmitted in a long distance in a low current type, maintaining a high voltage using a high voltage or ultra-high voltage transformer due to a loss in a conductor by a large current. However, in the above AC power transmission, there is a certain limit in a long distance transmission due to a capacitive load between a transmission cable and ground and an inductance existing in a transmission cable.

As a mess storage thyristor is developed to convert the AC into DC, it becomes possible to transmits a direct current which was a problem in the art. Since the direct current transmission method is implemented based on a thyristor which is capable of performing a phase control, a harmonic problem occurs. Namely, a harmonic component occurs in connection with the number of pulses of a converter in an input current and output voltage due to a switching operation of a thyristor convertor. Assuming that the number of pulses of a converter is P, a harmonic of Pn±1(n represents an integer) occurs in an input current, end a harmonic of Pn occurs in an output voltage.

Therefore, as a method for decreasing harmonic, there is known a method for increasing the number of pulses of a thyristor, a methods for inserting a harmonic liter in the side of AC, and a method for removing a harmonic problem using a device having an arc extinguishing function like IGBT(insulator Gate Bipola Transistor) of GTO(Gate Turn Off Thyristor). Among the above methods, the self-arc extinguishing HVDC system implemented using IGBT end GTO has many problems for actually using the same since a technical review is not ended.

In addition, the above method for increasing the number of pulses of a thyristor and the method for additionally inserting a harmonic filter in the side of the AC are generally implemented in such a manner that the pulses of the thyristor is 12, and a harmonic filter is inserted in the side of the AC in consideration with an economical reason. If the number of pulses of a thyristor exceeds 12 pulses, since the harmonic is decreased, the capacity of the harmonic filter is advantageously decreased, but an economical burden problem occurs because a thyristor stack must be additionally provided.

Figure 1:
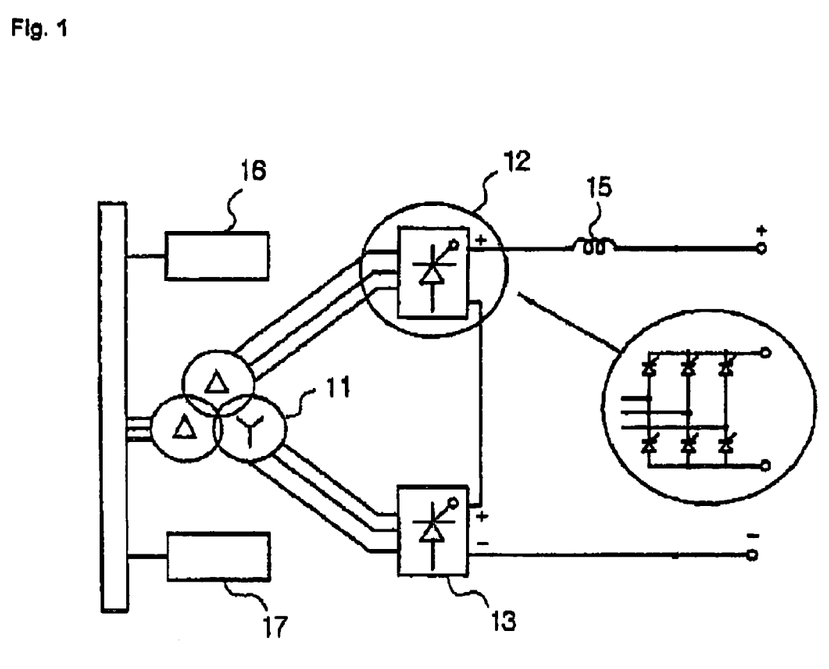
FIG. 1 is a circuit diagram illustrating a HVDC using a conventional thyristor.

FIG. 1 is a circuit diagram illustrating a HVDC using a conventional thyristor. As shown therein, since the HVDC system uses a natural arc extinguishing device like a thyristor, a 6-pulse thyristor stack like thyristor converters 12, 13 are basically used. Additionally, a 6-pulse thyristor stack of a Δ winding transformer which has a certain degree behind by 30° is connected to a Y-winding transformer in series for thereby increasing the number of pulses of a HVDC system and decreasing a voltage harmonic in the side of DC.

In the above conventional HVDC system, it is needed to connect a lower order harmonic filter 17 capable of decreasing a lower order harmonic and a higher order harmonic filter 18 to the side of AC due to a harmonic component. In addition, a Y-connection is performed in a primary side using a Δ-Δ-Y transformer 11 without using a Y-Δ transformer, and a Y-Δ transformer is used in a secondary side. Since the HVDC system of a thyristor type is a constant current system, a reactor 15 is additionally needed in a DC output terminal.

Figure 2:
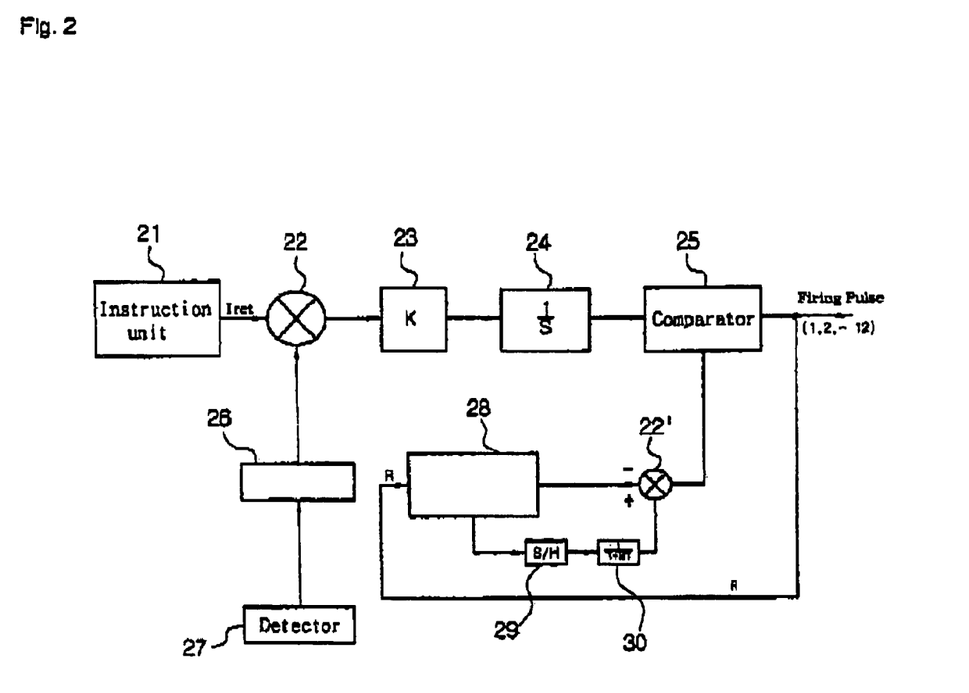
FIG. 2 is a block diagram illustrating a controller of a conventional 12-pulse thyristor HVDC system.

FIG. 2 is a block diagram illustrating a controller of a conventional 12-pulse thyristor HVDC system, which includes an instruction unit 21, a detector 27, a noise filter 26 for removing noises of a signal detected, and an adder 22 for comparing an instruction signal and a detected signal and generating an error signal. The error signal is inputted into a comparator 25 through a proportional controller(K) capable of amplifying an error signal and an integrator 24 which integrates an error signal.

In addition, the thyristor HVDC system operates based on a basic principle that a thyristor is driven with a regular interval signal for decreasing any effects of a harmonic. The output signal of a filtering circuit 30 has a constant DC value in such a manner that the portions synchronized to a frequency of a system corresponds to a ramp generator 28, and an output of the ramp generator 28 is a digital saw tooth wave coinciding with the frequency of the system, and the above value is inputted into a filtering circuit $1/(1+ST)$ 30 through a sampling/holder(S/H) 29.

When the above value is compared with a saw tooth wave from the ramp generator 28 by the adder 22', an output value of the adder 22' becomes a reverse saw tooth waveform. The above reverse saw tooth waveform is compared with en error value from the integrator $(1/s)$ 24 by the comparator 25, so that a firing pulse of a thyristor occurs at a point where the size of the reverse saw tooth wave meets with the error value.

At this time, in the case that the generated pulse fires 12 thyristors, the pulse becomes 12 pulses, and in the case that the generated pulse fires 6 thyristors, the pulse becomes 6 pulses. In the case that the number of pulses of the thyristor is increased in the method of FIG. 1, the stacks of the thyristors are connected in series.

Figure 3:
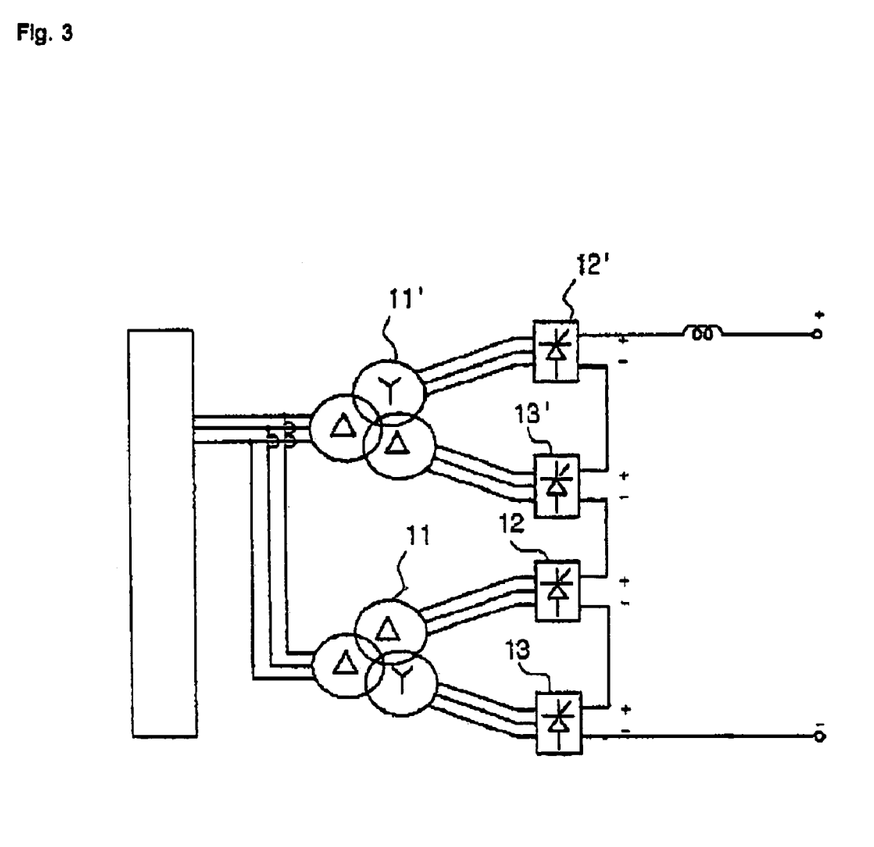
FIG. 3 is a circuit diagram illustrating a conventional 24-pulse thyristor HVDC system.

FIG. 3 is a circuit diagram illustrating a conventional 24-pulse thyristor HVDC system. In the 24-pulse thyristor HVDC system, a 12-pulse thyristor is additionally connected to the 12-pulse thyristor circuit of FIG. 1 in series. Namely, the above construction is implemented in such a manner that the 12-pulse circuit of the Δ-Y-Δ transformer 11' and the 12-pulse circuit of the Δ-Δ-Y transformer 11 are combined. The above method has disadvantages in an economical basis as the number of the thyristors is increased. In addition, the converters 12' 13' of the 6-pulse thyristor stack is connected to the Δ-Y-Δ transformer 11', and the converters 12, 13 of the 6-pulse thyristor stack is connected with the Δ-Δ-Y transformer 11.

Figure 4:
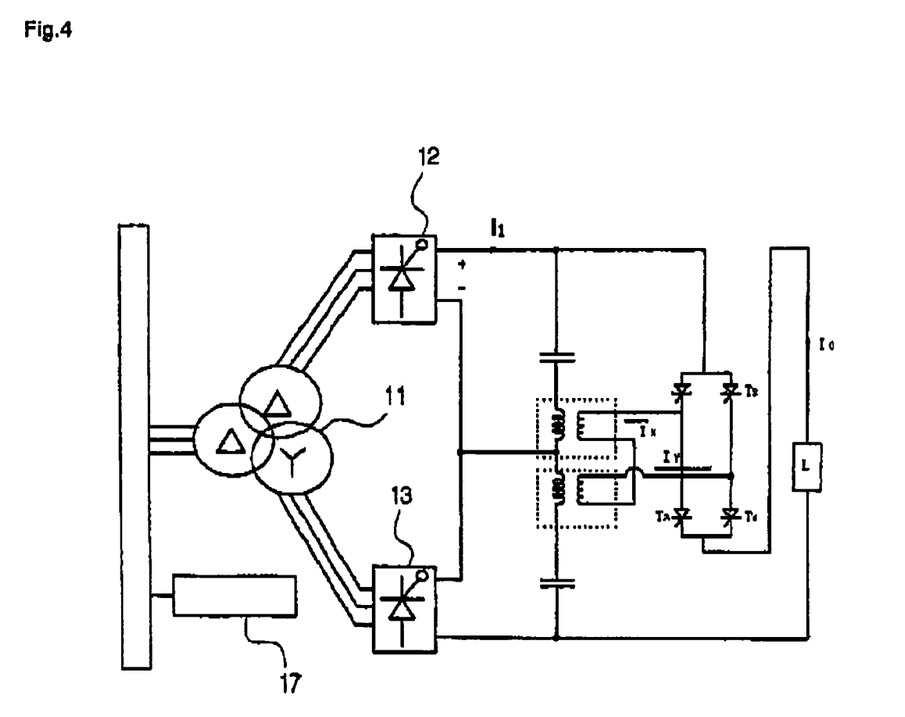
FIG. 4 is a circuit illustrating a 24-pulse HVDC system using a conventional auxiliary circuit.

FIG. 4 is a circuit diagram illustrating a 24-pulse HVDC system using a conventional auxiliary circuit. The above circuit has an operation characteristic of the operation system of the 24-pulse thyristor HVDC system of FIG. 3 and is capable of enhancing an efficiency of the system using the decreased number of the thyristor devices.

Namely, as shown in FIG. 1, in the operation principle of the 24-pulse HVDC system using an auxiliary circuit, there is provided a 24-pulse thyristor HVDC system having an additional auxiliary circuit having a characteristic that the 24-pulse operation is implemented by decreasing and increasing the thyristor output current $i_1$ using the auxiliary circuit capable of reversely flowing the current in the 12-pulse circuit as shown in FIG. 1.

Therefore, since the current reverse flow auxiliary circuit is additionally connected to the conventional 12-pulse thyristor HVDC system for thereby performing the operation based on the 24-pulse thyristor HVDC system, it is not economical.

SUMMARY OF THE INVENTION

Accordingly, it is an object of the present invention to provide a multi-pulse HVDC system using an auxiliary circuit which overcomes the problems encountered in the conventional HVDC system.

It is another object of the present invention to provide a multi-pulse HVDC system using an auxiliary circuit which is capable of implementing a 24-pulse thyristor HVDC system by additionally connecting two thyristors to a conventional 12-pulse thyristor HCDV system.

It is further another object of the present invention to provide a multi-pulse HVDC system using an auxiliary circuit which is capable of additionally connecting a limitless number of the thyristors because the operation that 12-pulse thyristor stack is added is implemented by adding one thyristor.

In order to achieve the above objects, there is provided a multi-pulse HVDC(High Voltage direct Current) system using an auxiliary circuit which is characterized in that an upper side thyristor converter 12 and a lower side thyristor converter 13 are installed in a Δ-Δ-Y transformer 11, and two current smoothing reactor 39 and a direct voltage dividing condenser 38 are installed between the upper side thyristor converter 12 and the lower side thyristor converter 13, and two thyristors 32, 33: $T_2$ and $T_1$ are connected to one double winding transformer 31.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The constructions and operations of the present invention will be explained with reference to the accompanying drawings.

Figure 5:
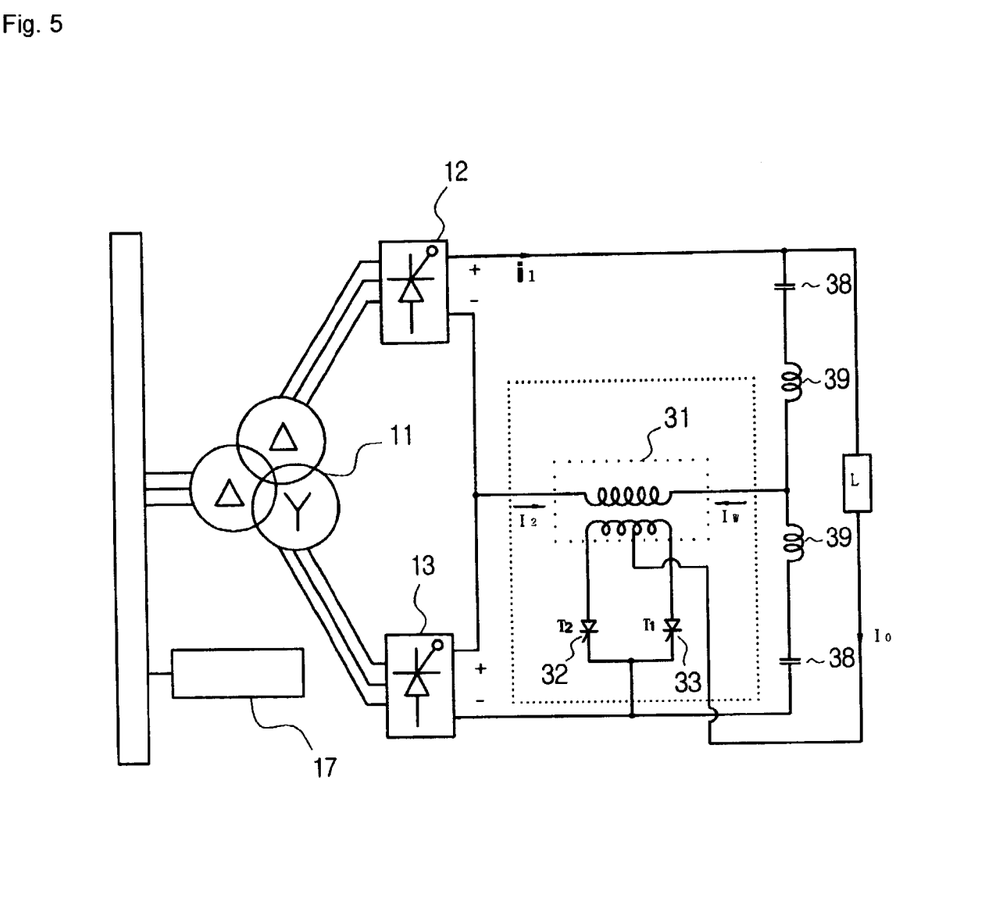
FIG. 5 is a circuit diagram illustrating a 24-pulse HVDC system using an auxiliary circuit according to the present invention.

FIG. 5 is a circuit diagram illustrating a 24-pulse HVDC system using an auxiliary circuit according to the present invention. The above construction is implemented in such a manner that the number of two double-winding transformers is decreased to one in the auxiliary circuit of FIG. 4 for thereby implementing the same operation as a 24-pulse thyristor HVDC system.

An upper side thyristor converter 12 and a lower side thyristor converter 13 are installed in the Δ-Δ-Y transformer 11. Two current smoothing reactors 39 and a direct current voltage dividing condenser 38 are installed between the upper side thyristor converter 12 and the lower side thyristor converter 13. In addition, there is provided two thyristors ($T_2$, $T_1$) 32, 33 each connected to one double-winding transformer 31.

The auxiliary circuit includes two current smoothing reactors 39, a direct current voltage dividing condenser 38 and two thyristors($T_2$, $T_1$) 32, 33 connected to one double winding voltage 31. The output voltages of the upper side thyristor converter 12 and the lower side thyristor converter 13 are changed based on a phase angle α and have a 12-pulse characteristic. At this time, the primary side voltage of the Δ-Δ-Y transformer 11 is 50% of the difference voltage of the output voltages of the upper side thyristor converter 12 and the lower side thyristor converter 13. The thyristors 32, 33 controls the output current in such a manner that at least one of the same always flows an output current, assuming a positive edge of the primary side voltage of the Δ-Δ-Y transformer 11 as a reference point of the control angles $β_2$, $β_3$ of each thyristor 32, 33. In the case that the voltage of the transformer 31 is positive, the thyristor 33 is biased in the forward direction and current-flows at $β_2$ for thereby conducting the output current 10 and abandoning the current of the forward direction to the primary side of the transformer 31. In the case that the voltage of the transformer 31 is negative, the thyristor 32 is biased in the forward direction for thereby conducting the output voltage at $β_3$ and abandoning the current in the reverse direction.

At this time, the current $I_2$ is divided and flows to each condenser 38, and the output current of each converter 12, 13 becomes the current which is combined and divided by $I_2$. The above operation is implemented in such a manner that the output current $I_0$ is not varied, and the currents of the upper side thyristor converter 12 and the lower side thyristor converter 13 are changed, so that as shown in FIG. 1, finally the input current of the Δ-Y-Δ transformer is varied for thereby generating a current similar to a sine wave in which the harmonic is relatively decreased.

Therefore, as shown in FIG. 1, the harmonic of the input current of the Δ-Y-Δ transformer is determined based on the number of pulses of the thyristor. If the number of the pulses is increased, the content rate harmonic is decreased.

Figure 6:
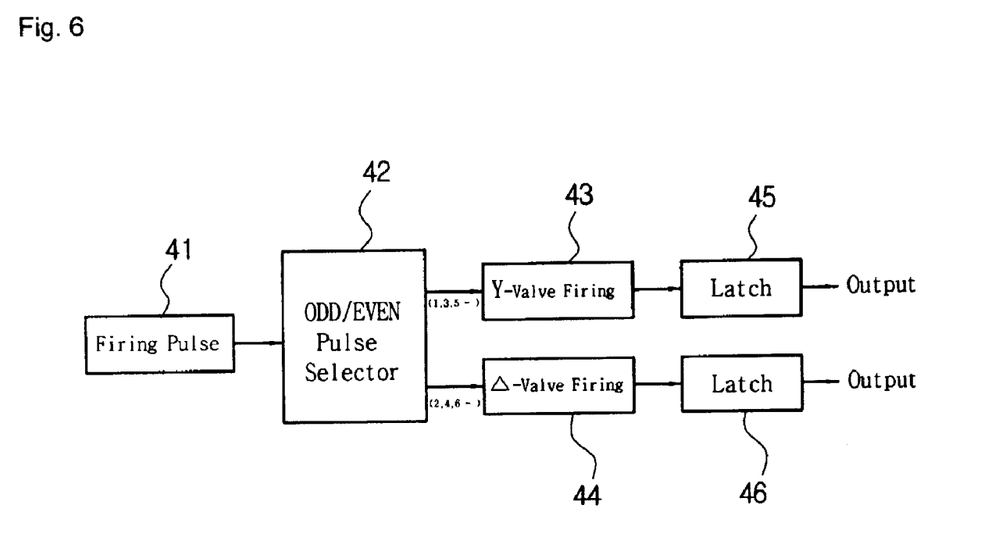
FIG. 6 is a block diagram illustrating a controller of an auxiliary circuit of FIG. 5.

FIG. 6 is a block diagram illustrating a controller of the auxiliary circuit of FIG. 5. Here, the auxiliary circuit is adapted to alternately change the output current of the 6-pulse thyristor of the secondary Y-connection of the transformer and the output current of the 6-thyristor of the secondary Δ-connection of the transformer for thereby improving an input current waveform of the HVDC system.

Therefore, since the control pulse of the auxiliary circuit must be coincided with a switching sequence of the 12-pulse thyristor circuit, the thyristor $T_2$ as shown in FIG. 5 controls the valve of the thyristor connected to the Y-connection transformer of the HVDC system, and the thyristor $T_2$ controls the valve of the thyristor connected to the Δ-connection transformer of the HVDC system.

The operation of FIG. 6 will be described. The firing signal 41, namely, the 12-pulse is received from the circuit of FIG. 2, and the Y-valve 6-pulse and the Δ-valve 6-pulse is selected based on an even/odd pulse selector 42. In addition, a signal is detected through the selected pulse using the Y-valve pulse generator 43 and the Δ-valve pulse generator 44. The detected signal gates the valve $T_1$ and the valve $T_2$ through latches 45, 46 for preventing a decrease of the signal.

Figure 7:
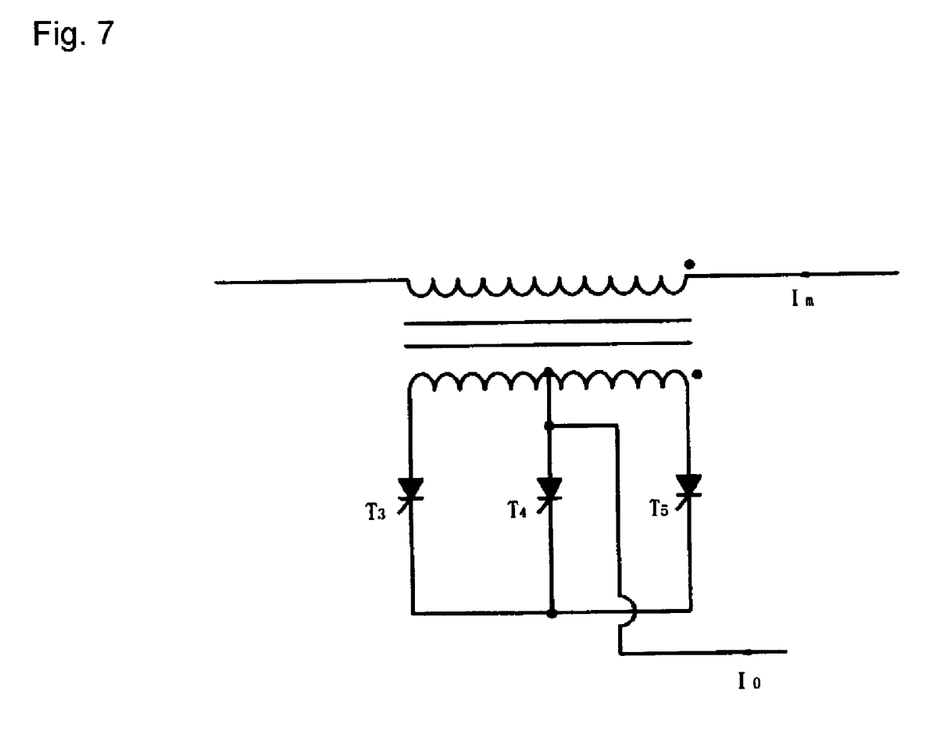
FIG. 7 is a circuit diagram in which an auxiliary circuit of FIG. 5 is changed.

FIG. 7 is a circuit diagram in which an auxiliary circuit of FIG. 1 is changed. Namely, FIG. 7 illustrates that the thyristor is connected to a neutral point of the transformer in the auxiliary circuit of FIG. 5. The upper side thyristor converter 12 and the lower side thyristor converter 13 are installed in the Δ-Δ-Y transformer 11. Two current smoothing reactors 39 and the direct current voltage dividing condenser 38 are installed between the upper side thyristor converter 12 and the lower side thyristor converter 13. Two thyristors $T_3$ and $T_5$ are connected with one double winding transformer 31. The thyristor $T_4$ is connected to a neutral point of the double winding transformer 31.

Therefore, the thyristor of the auxiliary circuit of FIG. 5 repeatedly perform the positive operation and negative operation, but in the auxiliary circuit of FIG. 7, the thyristor $T_3$ performs the positive operation, and the thyristor $T_4$ operates 0V, and the thyristor $T_5$ performs the negative operation. The waveform of the input current of the HVDC system has a characteristic of a 36-pulse thyristor operation.

Figure 8:
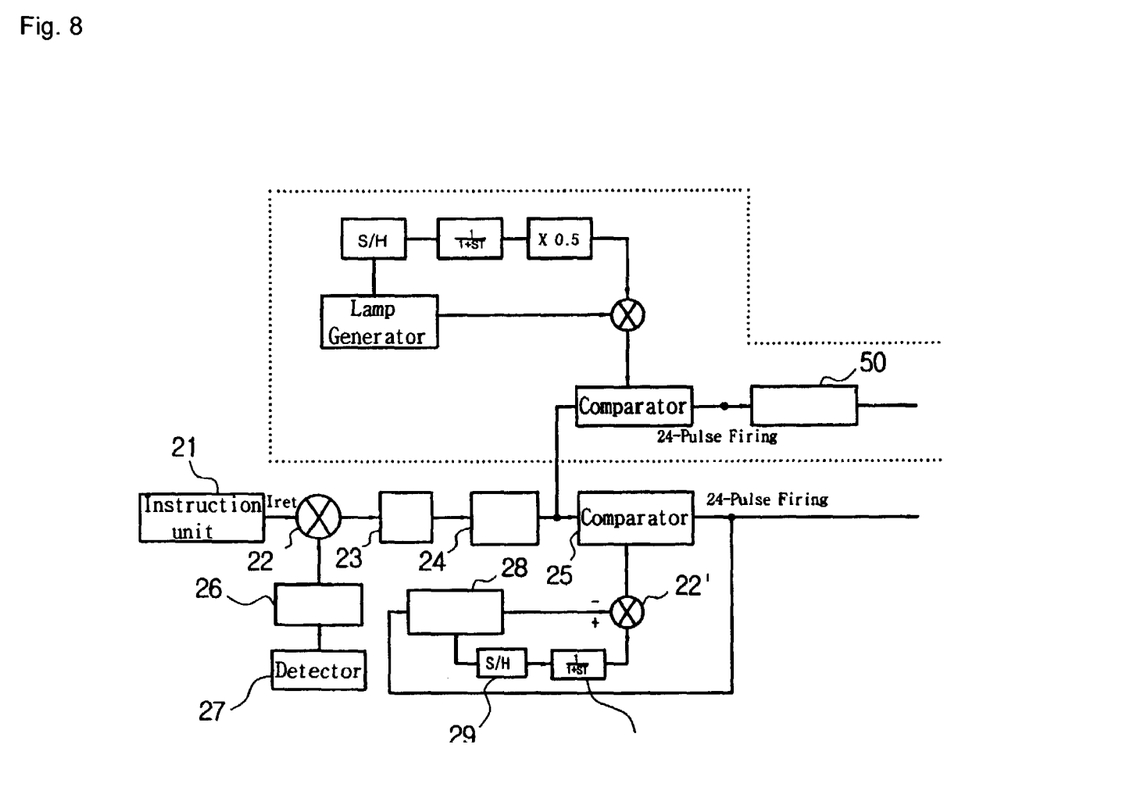
FIG. 8 is a block diagram illustrating a controller which generates a firing signal of an auxiliary circuit of FIG. 7.

FIG. 8 is a block diagram illustrating a controller which generates a firing signal of the auxiliary circuit of FIG. 7. As shown therein, the thyristor of FIG. 7 is fired through the sequencer 50 based on the pulse generated by the 24-pulse generator by additionally providing the 24-pulse generator in parallel with respect to the 12-pulse controller of FIG. 2.

At this time, the sequencer 50 is adapted to implement a certain repeated firing operation of the thyristor of FIG. 7 in the sequence of $T_3$-$T_4$-$T_5$-$T_5$-$T_4$-$T_3$-$T_3$-$T_4$-$T_5$.

Figure 9:
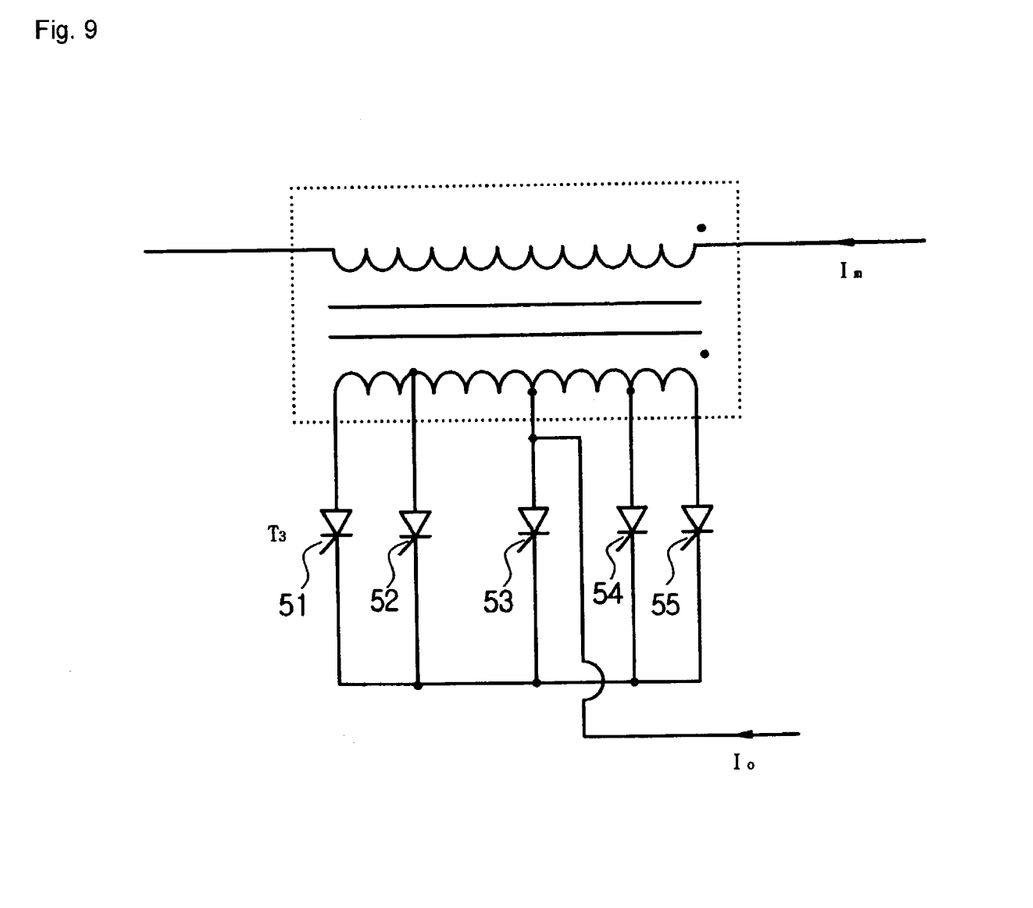
FIG. 9 is a circuit diagram in which three thyristors are added to an auxiliary circuit of FIG. 5.

FIG. 9 is a circuit diagram in which three thyristors are additionally provided to the auxiliary circuit of FIG. 5. In this case, the thyristor 51 of the auxiliary circuit performs the positive operation, the thyristor 52 performs the ½ positive operation, the thyristor 53 performs a 0-voltage, the thyristor 54 performs the ½ negative operation, and the thyristor 55 performs the negative operation. At this time, the HVDC system operates in the same manner as the operation of the 60-pulse thyristor system.

As shown in FIGS. 7 and 9, when the thyristors are further additionally provided, in the case that one thyristor is additionally provided in the construction of FIG. 5, the operation is performed in the same manner as that a 12-pulse thyristor stack is further provided. The above operation characteristic has an advantage that the thyristors may be added limitlessly.

As described above, it is possible to implement a 24-pulse thyristor HVDC system by providing two thyristors to the conventional 12-pulse thyristor HVDC system. Whenever one thyristor is added, the operation same as that the 12-pulse thyristor is added is implemented, so that it is possible to implement a multi-pulse HVDC system using an auxiliary circuit in which the thyristors may be provided limitlessly, whereby the present invention is very economical.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A multi-pulse HVDC(High Voltage direct Current) system, the system comprising:
    an upper side thyristor converter (12) and a lower side thyristor converter (13) installed in a Δ-Δ-Y transformer (11), and
    two current smoothing reactors (39), two direct voltage dividing condensers (38) and two thyristors ($T_1$, $T_2$) connected to one double winding transformer (31)
    wherein a Y-valve 6-pulse and Δ-value 6-pulse are selected through an even/odd pulse selector (42) by receiving a firing pulse (41), 12-pulse from two thyristors ($T_2$, $T_1$) and
    wherein a signal is detected through Y-valve pulse generator (43) and Δ-value pulse generator (44) with respect to the selected pulse, and the above detected signal sates the T1 value and T2 values through latches (45, 46) for preventing a decrease of the signal.

2. A multi-pulse HVDC system using an auxiliary circuit comprising an upper side thyristor converter (12) and a lower side thyristor converter (13) installed in a Δ-Δ-Y transformer (11), and two current smoothing reactor (39) and a direct current voltage dividing condenser (38) installed between the upper side thyristor converter (12) and the lower side thyristor converter (13),
    wherein a first and second thyristor are connected with one double winding transformer (31), and a third thyristor operating at 0 V is connected with a neutral point of the double winding transformer (31) so that a waveform of an input current of the HVDC has a characteristic of a 36-pulse thyristor operation.

3. The system of claim 2, configured to function as a 60-pulse thyristor HVDC by connecting the first, second and third thyristors with a tap of the transformer (31).

4. The system of claim 2, configured to add the function of a 12-pulse thyristor stack for each additional thyristor connected to a tap of the transformer (31).

* * * * *